United States Patent
Kadowaki

(10) Patent No.: US 12,553,936 B2
(45) Date of Patent: Feb. 17, 2026

(54) EVALUATION METHOD AND EVALUATION SYSTEM FOR ELECTRONIC PEN

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/054,599

(22) Filed: Feb. 14, 2025

(65) Prior Publication Data

US 2025/0189574 A1    Jun. 12, 2025

Related U.S. Application Data

(63) Continuation of application No. PCT/JP2023/031498, filed on Aug. 30, 2023.

(60) Provisional application No. 63/402,783, filed on Aug. 31, 2022.

(51) Int. Cl.
G06F 3/041 (2006.01)
G01R 31/28 (2006.01)
G06F 3/0354 (2013.01)

(52) U.S. Cl.
CPC ..... G01R 31/2829 (2013.01); G06F 3/03545 (2013.01); G06F 3/0418 (2013.01)

(58) Field of Classification Search
CPC ............ G01R 31/2829; G06F 3/03545; G06F 3/0418; G06F 3/041
See application file for complete search history.

(56) References Cited

U.S. PATENT DOCUMENTS

| | | | |
|---|---|---|---|
| 2003/0019119 A1* | 1/2003 | Sato ....................... | B23Q 17/24 33/503 |
| 2005/0086025 A1* | 4/2005 | Nomura ................. | G01B 21/04 702/167 |

(Continued)

FOREIGN PATENT DOCUMENTS

JP    6473554 B1    2/2019

OTHER PUBLICATIONS

International Search Report, dated Nov. 14, 2023, for International Application No. PCT/JP2023/031498. (2 pages) (English translation).

*Primary Examiner* — Temesghen Ghebretinsae
*Assistant Examiner* — Sosina Abebe
(74) *Attorney, Agent, or Firm* — Seed Intellectual Property Law Group LLP

(57) ABSTRACT

Provided is an evaluation method for an electronic pen by an evaluation system including a planar sensor and a movement mechanism, the evaluation method including disposing the planar sensor such that a direction of a third axis orthogonal to each of a first axis and a second axis in a three-dimensional machine coordinate system defined for controlling driving of the movement mechanism is orthogonal to a sensor coordinate plane formed by a first axis and a second axis of a two-dimensional sensor coordinate system defined in the planar sensor, performing angle adjustment by causing an orientation of a machine coordinate plane to correspond with an orientation of the sensor coordinate plane by rotating the planar sensor disposed, with a direction normal to the planar sensor being an axis of rotation, and performing position adjustment by causing a sensor reference point to correspond with a machine reference point.

7 Claims, 6 Drawing Sheets

(56) References Cited

U.S. PATENT DOCUMENTS

| | | | | |
|---|---|---|---|---|
| 2009/0030648 A1* | 1/2009 | Hunter | ................ | G01B 21/04 |
| | | | | 33/503 |
| 2009/0248345 A1* | 10/2009 | Jonas | ................ | G01B 21/042 |
| | | | | 33/502 |
| 2017/0185167 A1* | 6/2017 | Kitagawa | ............ | G06F 1/1632 |
| 2020/0049498 A1* | 2/2020 | Rees | .................. | G01B 5/008 |
| 2020/0094407 A1* | 3/2020 | Nahum | ............... | B25J 9/1664 |
| 2020/0386579 A1* | 12/2020 | Terashita | ........... | G01B 11/005 |
| 2021/0173512 A1* | 6/2021 | Taya | .................. | G06F 3/0416 |
| 2022/0042780 A1* | 2/2022 | Kamitani | ............ | G01B 5/012 |

\* cited by examiner

EVALUATION METHOD AND EVALUATION SYSTEM FOR ELECTRONIC PEN

BACKGROUND

Technical Field

The present disclosure relates to an evaluation method and an evaluation system for an electronic pen.

Description of the Related Art

As related art, a method in which the performance of an electronic pen is evaluated with use of an evaluation jig and various settings relating to the performance are adjusted as required is known (for example, refer to Japanese Patent No. 6473554).

For example, seeking automation of evaluation by moving an electronic pen in the state in which a movement mechanism including a robot is caused to grasp the electronic pen is assumed. In this case, moving the electronic pen to a desired three-dimensional position requires execution of position adjustment (or calibration) to cause a "machine coordinate system" defined to control driving of the movement mechanism to correspond with a "sensor coordinate system" defined in a planar sensor for detecting the position of the electronic pen. Hence, there is a demand to execute the above-described position adjustment with a simpler system configuration.

BRIEF SUMMARY

The present disclosure is made in view of the above-described problem, and embodiments thereof provide an evaluation method and an evaluation system for an electronic pen that can execute position adjustment between a machine coordinate system and a sensor coordinate system with a simpler system configuration.

An evaluation method for an electronic pen in a first aspect of the present disclosure is a method using an evaluation system including a planar sensor that detects a position of the electronic pen and a movement mechanism that moves the electronic pen in a state in which the movement mechanism is grasping the electronic pen. The evaluation method includes disposing the planar sensor such that a direction of a third axis orthogonal to each of a first axis and a second axis in a three-dimensional machine coordinate system defined for controlling driving of the movement mechanism is orthogonal to a sensor coordinate plane formed by a first axis and a second axis of a two-dimensional sensor coordinate system defined in the planar sensor. The evaluation method includes also performing angle adjustment by causing an orientation of a machine coordinate plane formed by the first axis and the second axis of the three-dimensional machine coordinate system to correspond with an orientation of the sensor coordinate plane by rotating the planar sensor disposed, with a direction normal to the planar sensor being an axis of rotation, and performing position adjustment by causing a reference point on the sensor coordinate plane that has been rotated to correspond with a reference point on the machine coordinate plane.

An evaluation system for an electronic pen in a second aspect of the present disclosure includes a planar sensor that detects a position of the electronic pen, a movement mechanism that moves the electronic pen in a state in which the movement mechanism is grasping the electronic pen, a control apparatus that controls driving of the movement mechanism, and a rotation mechanism that rotates the planar sensor, with a direction normal to the planar sensor being an axis of rotation. The planar sensor is disposed such that a direction of a third axis orthogonal to each of a first axis and a second axis in a three-dimensional machine coordinate system defined for controlling driving of the movement mechanism is orthogonal to a sensor coordinate plane formed by a first axis and a second axis of a two-dimensional sensor coordinate system defined in the planar sensor. The control apparatus adjusts the position of a machine coordinate plane formed by the first axis and the second axis of the three-dimensional machine coordinate system by causing a reference point on the sensor coordinate plane to correspond with a reference point on the machine coordinate plane in a state in which the planar sensor has been rotated by the rotation mechanism by causing the orientation of the machine coordinate plane to correspond with the orientation of the sensor coordinate plane.

According to the present disclosure, the position adjustment between the machine coordinate system and the sensor coordinate system can be executed with a simpler system configuration.

DETAILED DESCRIPTION OF THE PREFERRED EMBODIMENT

An evaluation method for an electronic pen and an evaluation system for an electronic pen in the present disclosure will be described with reference to the accompanying drawings. To facilitate understanding of the description, the same constituent element is given the same numeral as much as possible in the respective drawings, and overlapping description is omitted.

Description of Evaluation System 10

Overall Configuration

Figure 1:
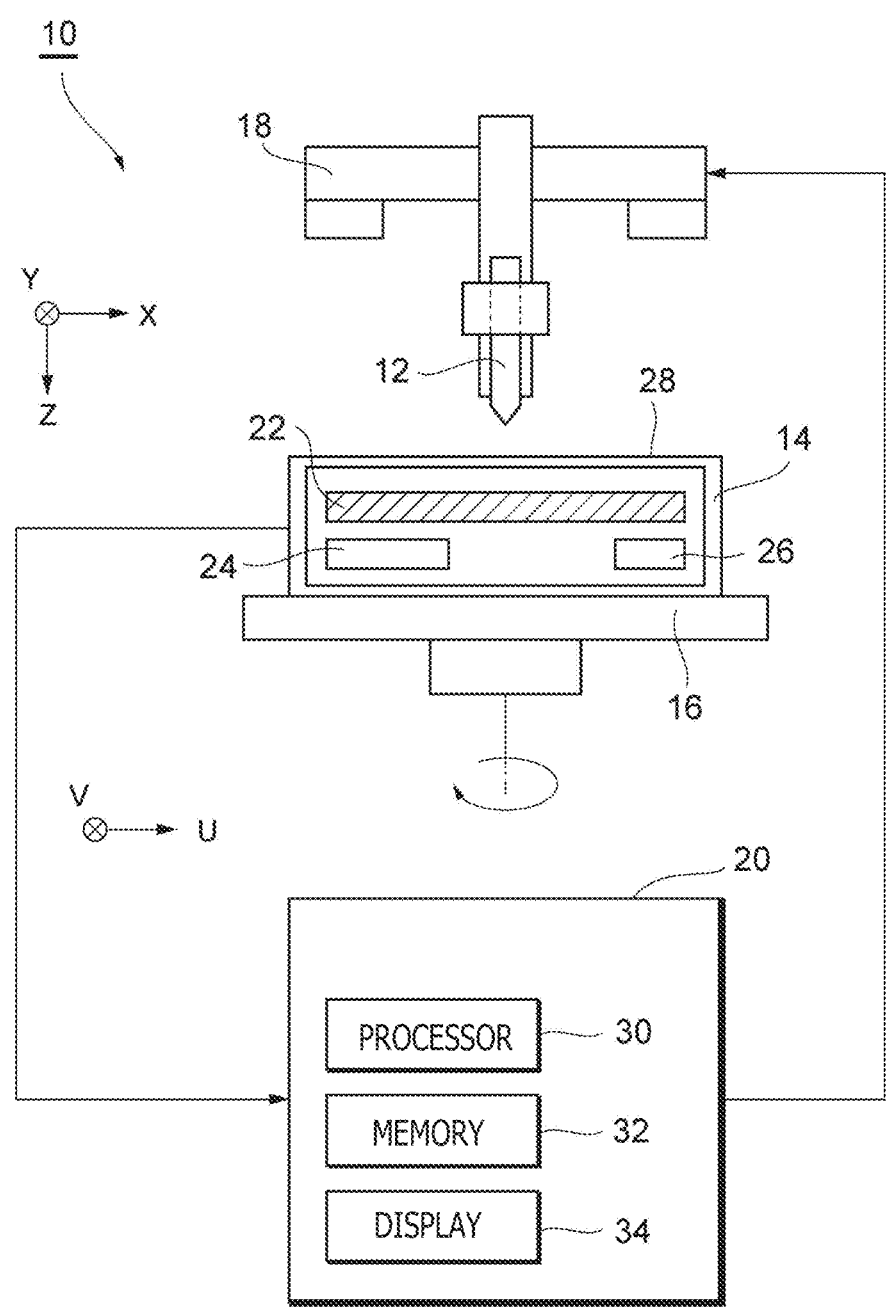
FIG. 1 is an overall configuration diagram of an evaluation system for an electronic pen in one embodiment of the present disclosure.

FIG. 1 is an overall configuration diagram of an evaluation system 10 for an electronic pen 12 in one embodiment of the present disclosure. The evaluation system 10 is installed to evaluate the performance of the electronic pen 12. Examples of the "performance of the electronic pen 12" include the detection accuracy of a position indicated by the electronic pen, responsiveness to operations, and a communication state. Further, the use of the "evaluation" may be any of, for example, inspection at the time of shipment, performance comparison between products, and analysis of a defective product.

Specifically, the evaluation system 10 for the electronic pen 12 includes an inspection terminal 14, a rotation mechanism 16, a movement mechanism 18, and a control apparatus 20. The electronic pen 12 is a pen-type pointing device and is configured to be capable of unidirectionally or bidirectionally communicating with the inspection terminal 14. For example, this electronic pen 12 is a stylus of an active capacitance (AES) system or an electromagnetic resonance (EMR) system.

The inspection terminal 14 is formed of, for example, a tablet terminal, a smartphone, a personal computer, or the like that has/does not have a display function. Specifically, the inspection terminal 14 includes a planar sensor 22, a sensor controller 24, and a host processor 26. A touch surface 28 with which a pen tip of the electronic pen 12 comes into contact is disposed over the planar sensor 22.

When the electronic pen 12 is a stylus of the AES system, the planar sensor 22 is a sensor of a capacitive system (more specifically, a mutual capacitance system or a self-capacitance system) obtained by disposing a plurality of sensor electrodes in a planner manner. When the electronic pen 12 is a stylus of the EMR system, the planar sensor 22 is a sensor that detects an alternating magnetic field sent out from the electronic pen 12 through a plurality of detection coils two-dimensionally arranged.

Here, a "two-dimensional sensor coordinate system" is defined in order to identify the position on the planar sensor 22. The two-dimensional sensor coordinate system is configured from a U-axis (equivalent to a "first axis") and a V-axis (equivalent to a "second axis") orthogonal to each other. Hereinafter, the plane formed by the U-axis and the V-axis is referred to as the "sensor coordinate plane" in some cases.

The sensor controller 24 is a control circuit that is connected to the planar sensor 22 and is used for controlling communication with the electronic pen 12 through the planar sensor 22. The sensor controller 24 outputs various kinds of data indicating the indicated position, the tilt angle, or the writing pressure regarding the electronic pen 12 to the host processor 26.

The host processor 26 executes generation processing of digital ink, display processing of a pointer, or the like by using the data sequentially output from the sensor controller 24. Further, the host processor 26 transmits the data from the sensor controller 24 to the control apparatus 20 through wired communication or wireless communication.

The rotation mechanism 16 is configured to rotate the inspection terminal 14 placed on a rotating table in a clockwise manner or an anticlockwise manner. Power for the rotation may be given through a rotary actuator that is not illustrated, or be given through rotation operation by a worker.

The movement mechanism 18 is configured to move the electronic pen 12 in the state in which the movement mechanism 18 is grasping the electronic pen 12. In the example of FIG. 1, the movement mechanism 18 is a Cartesian robot having three slide shafts orthogonal to each other. Here, a "three-dimensional machine coordinate system" is defined in order to identify the position of the movement mechanism 18. The three-dimensional machine coordinate system is configured from three axes, i.e., an X-axis (equivalent to the "first axis"), a Y-axis (equivalent to the "second axis"), and a Z-axis (equivalent to a "third axis") orthogonal to each other. Hereinafter, the plane formed by the X-axis and the Y-axis is referred to as the "machine coordinate plane" in some cases.

The control apparatus 20 is a computer that controls driving of the movement mechanism 18 (or the rotation mechanism 16). Specifically, the control apparatus 20 includes a processor 30, a memory 32, and a display 34.

The processor 30 is configured by a computation processing apparatus including a central processing unit (CPU), a graphics processing unit (GPU), or a micro-processing unit (MPU). The processor 30 executes driving control for the movement mechanism 18, driving control for the rotation mechanism 16, or display control for the display 34 by reading out a control program stored in the memory 32 and executing it.

The memory 32 is configured by a non-transitory computer-readable recording medium (or storage medium). Here, the computer-readable recording medium is a storage apparatus including a hard disk drive (HDD) or a portable medium such as a magneto-optical disc, a read only memory (ROM), a compact disk (CD)-ROM, or a flash memory. In the memory 32, for example, calibration data of the three-dimensional machine coordinate system or an inspection result of the electronic pen 12 is stored.

The display 34 can display a monochrome image or a color image, and is formed of, for example, a liquid crystal panel, an organic electro-luminescence (EL) panel, or electronic paper. The display 34 displays machine coordinate values indicating the position of the movement mechanism 18 and sensor coordinate values indicating the position indicated by the electronic pen 12 in response to a command from the processor 30.

Description of Evaluation Method

The evaluation system 10 in this embodiment is configured as described above. Subsequently, an evaluation method for the electronic pen 12 by use of the evaluation system 10 will be described with reference to a flowchart of FIG. 2.

Step S11: Disposing Step

Figure 2:
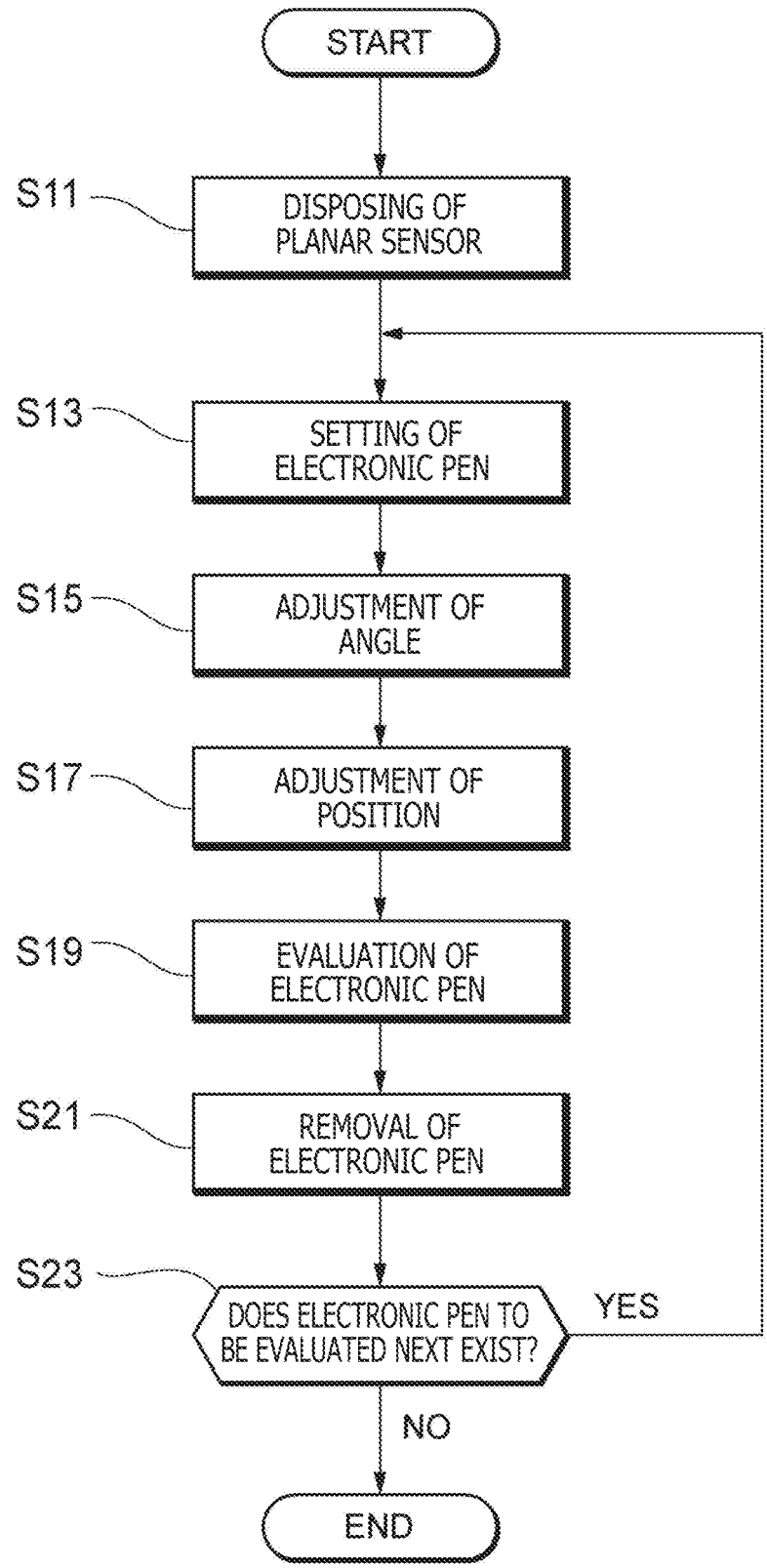
FIG. 2 is a flowchart illustrating one example of an evaluation method using the evaluation system of FIG. 1.

In a "disposing step" of step S11 in FIG. 2, disposing of the planar sensor 22 is executed. Specifically, a worker places the inspection terminal 14 in which the planar sensor 22 is incorporated on the rotating table of the rotation mechanism 16. This causes the planar sensor 22 to be disposed in such a manner that the direction of the Z-axis forming the three-dimensional machine coordinate system (XYZ coordinate system) is orthogonal to a sensor coordinate plane 40 (UV coordinate system). Here, "orthogonal" includes not only the case in which the elements are completely orthogonal but also the case in which the elements are substantially orthogonal with an error from the right angle within an allowable range (for example, within ±3°).

Step S13: Setting Step

In a "setting step" of step S13, setting of the electronic pen 12 that is an evaluation target is executed. Specifically, a worker causes a movable portion of the movement mechanism 18 (here, an arm of a Cartesian robot) to grasp the electronic pen 12.

Step S15: Angle Adjustment Step

In an "angle adjustment step" of step S15, angle adjustment of the planar sensor 22 is executed. Specifically, the worker or the control apparatus 20 rotates the rotation mechanism 16 on which the inspection terminal 14 is set, by a desired angle. As a result, the angle adjustment is executed to cause the orientation of a machine coordinate plane 50 formed by the X-axis and the Y-axis of the three-dimensional machine coordinate system to correspond with the orientation of the sensor coordinate plane 40. Here, "correspond with" includes not only the case in which the orientations completely correspond with each other but also the case in which the orientations substantially correspond with each other with an error within an allowable range (for example, within ±3°).

This angle adjustment step includes [1] a setting step, [2] an acquisition step, [3] a decision step (or a tentative decision step), and [4] a settlement step. In the "setting step," a reference point on the sensor coordinate plane 40 (hereinafter, the sensor reference point) and a reference point on the machine coordinate plane 50 (hereinafter, the machine reference point) are each set. In the "acquisition step," a coordinate value set indicating the positions of a plurality of points on the sensor coordinate plane 40 corresponding to the positions of a plurality of points that exist on the X-axis of the machine coordinate plane 50 or on an imaginary line parallel to this X-axis is acquired. In the "decision step," the amount of rotation of the planar sensor 22 is decided from the coordinate value set acquired in the acquisition step. In the "settlement step," the orientation of the planar sensor 22 is settled by executing the acquisition step and the decision step one time or repeatedly executing these steps two or more times.

Further, regarding the acquisition step, the plurality of points may include a first point and a second point selected in such a manner that the reference point on the machine coordinate plane 50 (that is, the machine reference point) is interposed between the first and second points. The machine reference point may be the midpoint between the first point and the second point, but does not need to be the midpoint. Moreover, the acquisition step may include [1] a step in which the electronic pen 12 executes pen-down and pen-up at one point among the plurality of points on the touch surface 28 through driving by the movement mechanism 18 and [2] a step in which the sensor controller 24 acquires coordinate values indicating the position of the one point on the sensor coordinate plane 40, with detection of the pen-down being the trigger.

Note that it is more preferable to realize the state in which the pen tip of the electronic pen 12 is kept from coming into contact with the touch surface 28 (that is, a hover state) while the electronic pen 12 is moved. This is because the pen tip of the electronic pen 12 has a slight gap in terms of the mechanism and mechanical sticking could occur at the core portion of the pen tip when the electronic pen 12 is moved in the state in which the pen tip is in contact with the touch surface 28 (what is generally called a contact state).

Step S17: Position Adjustment Step

In a "position adjustment step" of step S17, position adjustment of the machine coordinate plane 50 is executed. Specifically, the control apparatus 20 causes parallel movement of the machine reference point on the machine coordinate plane 50 by a predetermined amount of movement. This causes the sensor reference point on the sensor coordinate plane 40 that has been rotated to correspond with the machine reference point on the machine coordinate plane 50. Here, "correspond with" includes not only the case in which the reference points completely correspond with each other but also the case in which the reference points substantially correspond with each other with an error within an allowable range (for example, within ±3 mm).

Step S19: Evaluation Step

In an "evaluation step" of step S19, performance evaluation of the electronic pen 12 is executed. Specifically, the control apparatus 20 executes various evaluations including the detection accuracy of the position, the responsiveness to operation, or the communication state by moving the electronic pen 12 in accordance with an operation sequence settled in advance.

Step S21: Removal Step

In a "removal step" of step S21, the electronic pen 12 is removed from the movement mechanism 18. This ends the performance evaluation of the electronic pen 12 as the evaluation target.

Step S23: Check Step

In a "check step" of step S23, whether the electronic pen 12 to be evaluated next exists is checked. When the electronic pen 12 as an evaluation target exists (step S23: YES), the process returns to step S13, and then steps S13 to S23 are repeatedly executed. On the other hand, when the electronic pen 12 as an evaluation target does not exist (step S23: NO), the execution of the flowchart illustrated in FIG. 2 ends. In the above-described manner, the evaluation system 10 executes evaluation operation for one or a plurality of electronic pens 12.

Specific Example of Adjustment Method

Figure 3:
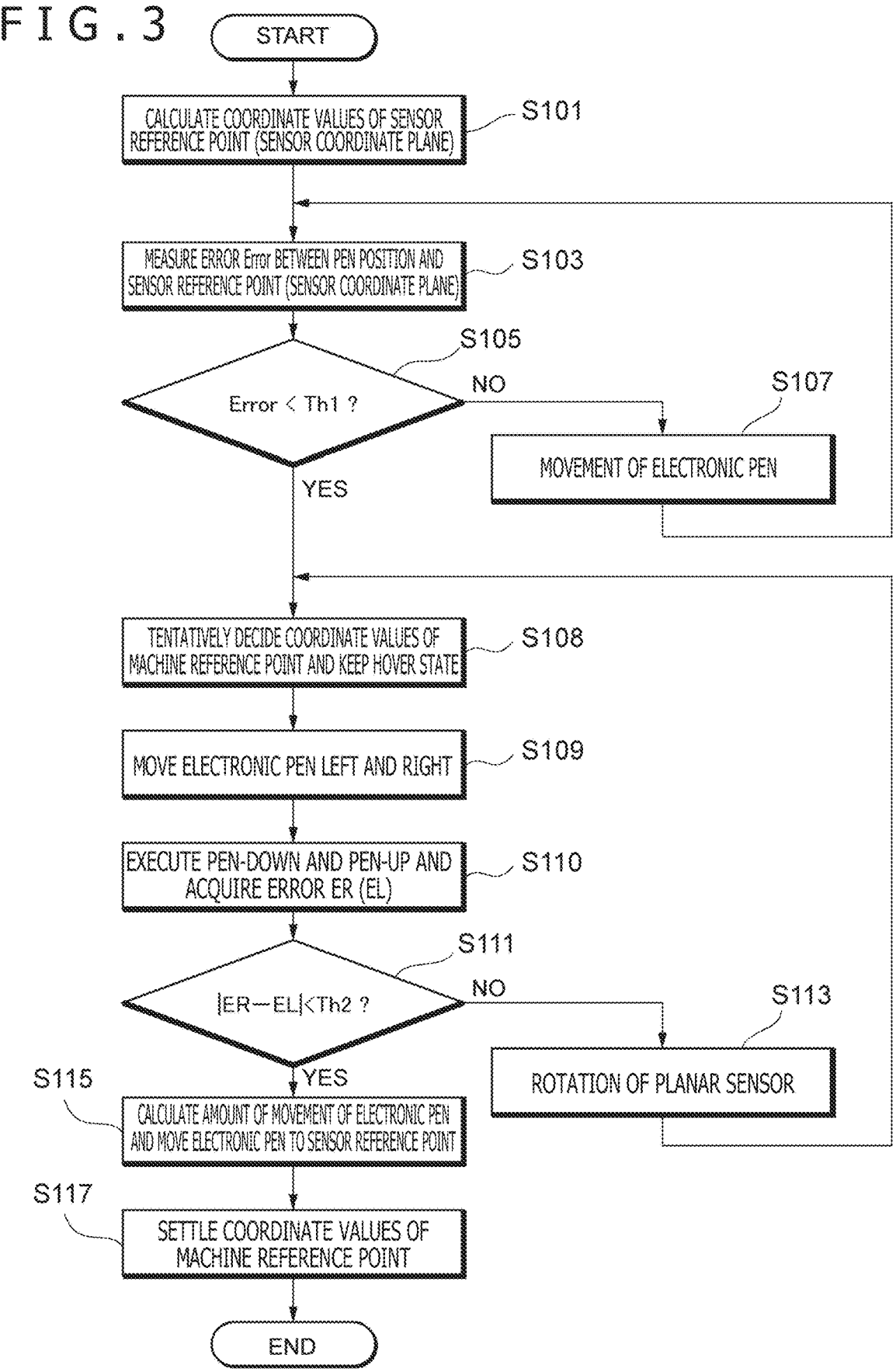
FIG. 3 is a detailed flowchart relating to an angle adjustment step (step S15) and a position adjustment step (step S17) in FIG. 2.

Subsequently, a specific example of the adjustment method by the evaluation system 10 will be described in detail with reference to FIGS. 3 to 7. FIG. 3 is a detailed flowchart relating to the angle adjustment step (step S15) and the position adjustment step (step S17) in FIG. 2.

In step S101 in FIG. 3, the control apparatus 20 acquires the coordinate values of a sensor reference point CP on the sensor coordinate plane 40.

Figure 4:
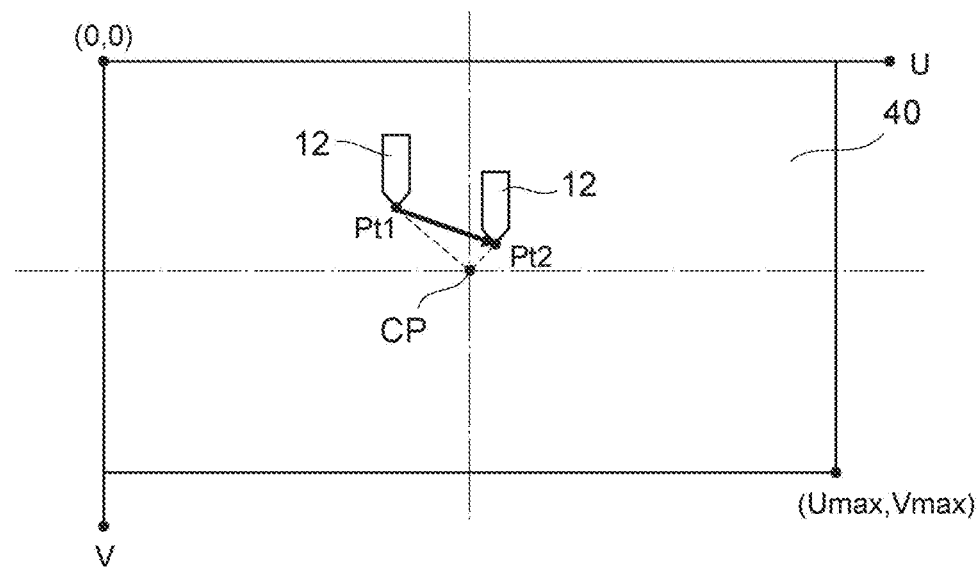
FIG. 4 is a diagram illustrating one example of a decision method for a sensor reference point on a sensor coordinate plane.

FIG. 4 is a diagram illustrating one example of a decision method for the sensor reference point CP on the sensor coordinate plane 40. Here, the position of the upper left corner of the sensor coordinate plane 40 is defined as an origin O (0, 0). Further, the right direction from the origin O is defined as the positive direction of the U-axis, and the downward direction from the origin O is defined as the positive direction of the V-axis. In this case, the position of the lower right corner of the sensor coordinate plane 40 corresponds to the logical maximum value (Umax, Vmax). In the example of FIG. 4, the sensor reference point CP is set at the center (Umax/2, Vmax/2) of the sensor coordinate plane 40. However, the sensor reference point CP can be set at various positions other than the center.

In step S103 in FIG. 3, the control apparatus 20 measures an error Error between the current indicated position of the electronic pen 12 (hereinafter, the pen position Pt1) on the sensor coordinate plane 40 and the sensor reference point CP. Specifically, the control apparatus 20 acquires the coordinate values of the pen position Pt1 from the inspection terminal 14 and thereafter measures the distance from the sensor reference point CP (that is, error Error).

In step S105, the control apparatus 20 checks the magnitude relation between the error Error measured in step S103 and a threshold Th1. When a magnitude relation of Error≥Th1 is satisfied (step S105: NO), the control apparatus 20 advances to a step S107.

In step S107, the control apparatus 20 controls driving of the movement mechanism 18 to reduce the error Error measured in step S103. This moves the electronic pen 12 toward the sensor reference point CP on the sensor coordinate plane 40.

When the process returns to step S105 and the error has come to satisfy Error<Th1 with a certain pen position (step S105: YES), the control apparatus 20 advances to the next step S108.

In step S108, the control apparatus 20 sets the pen position on the machine coordinate plane 50 as a machine reference point Pt2 and keeps the hover state of the electronic pen 12.

In step S109, the control apparatus 20 controls the driving of the movement mechanism 18 to move the electronic pen 12 in the left-right direction (that is, the X-axis direction), with the machine reference point Pt2 being the starting point.

Figure 5A:
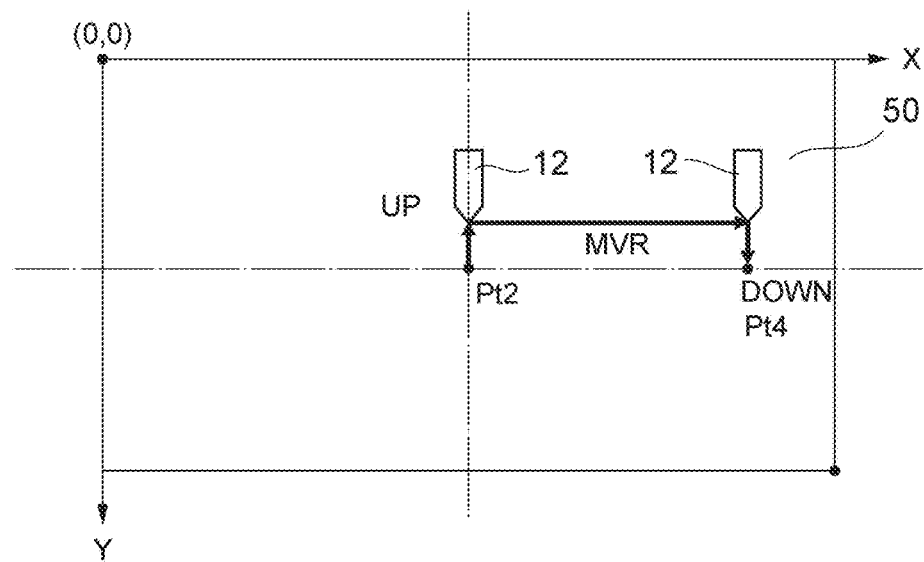
FIG. 5A is a diagram illustrating one example of a decision method for a first measurement point on a machine coordinate plane.

FIG. 5A is a diagram illustrating one example of a decision method for a first measurement point Pt4 on the machine coordinate plane 50. Here, the machine coordinate plane 50 is illustrated by a rectangular region of the sensor coordinate plane 40 identified from the machine reference point Pt2. The right direction from the position of the upper left corner of the machine coordinate plane 50 is defined as the positive direction of the X-axis, and the downward direction from this position is defined as the positive direction of the Y-axis. For example, the first measurement point Pt4 is equivalent to a position resulting from parallel movement from the machine reference point Pt2 by MVR in the X-axis positive direction. Further, although illustration is omitted in FIG. 5A, a second measurement point Pt5 is equivalent to a position resulting from shift from the machine reference point Pt2 by MVL in the X-axis negative direction.

In step S110 in FIG. 3, the control apparatus 20 controls driving to cause the electronic pen 12 to make point contact with the touch surface 28 (that is, pen-down and pen-up) after reaching the first measurement point Pt4 or the second measurement point Pt5. Further, the control apparatus 20 calculates each of the coordinate value on the V-axis regarding the first measurement point Pt4 and the coordinate value on the V-axis regarding the second measurement point Pt5.

Figure 5B:
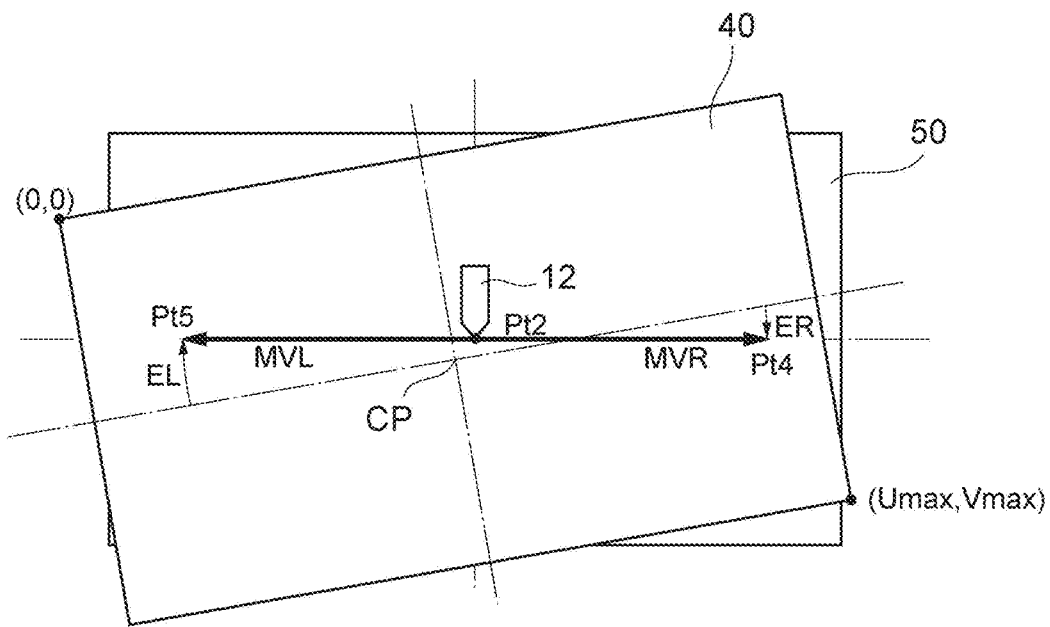
FIG. 5B is a diagram illustrating one example of a calculation result of a position error between the first measurement point and a second measurement point.

FIG. 5B is a diagram illustrating one example of a calculation method for the position error between the first measurement point Pt4 and the second measurement point Pt5. An error ER corresponds to the amount of position deviation on the V-axis between an imaginary line on the sensor coordinate plane 40 and the first measurement point Pt4. An error EL corresponds to the amount of position deviation on the V-axis between the imaginary line on the sensor coordinate plane 40 and the second measurement point Pt5. As is understood from FIG. 5B, the values of the errors ER and EL become larger as the deviation between the orientations of the sensor coordinate plane 40 and the machine coordinate plane 50 becomes larger.

In step S111 in FIG. 3, the control apparatus 20 checks the magnitude relation between a position error |ER−EL| and a threshold Th2. When a magnitude relation of |ER−EL|≥Th2 is satisfied (step S111: NO), the control apparatus 20 advances to step S113.

In step S113, the worker or the control apparatus 20 rotates the planar sensor 22 integrally with the inspection terminal 14 by driving the rotation mechanism 16 to reduce the position error calculated in step S110.

Thereafter, steps S111 and S113 are repeatedly executed until the position error becomes sufficiently small. Then, when the position error has come to satisfy a relation of |ER−EL|<Th2 (step S111: YES), the control apparatus 20 advances to the next step S115.

In step S115, the control apparatus 20 calculates the amount of movement of the electronic pen 12 from the difference between the machine reference point Pt2 and the sensor reference point CP on the sensor coordinate plane 40, and moves the electronic pen 12 to the sensor reference point CP.

In step S117, the control apparatus 20 settles the coordinate values of the current machine reference point Pt2 and stores these coordinate values in the memory 32.

In this manner, the control apparatus 20 ends the angle adjustment operation (step S15 in FIG. 2) and the position adjustment operation (step S17 in FIG. 2).

Summarization of Embodiment

As described above, the evaluation system 10 in this embodiment includes the planar sensor 22 that detects the position of the electronic pen 12, the movement mechanism 18 that moves the electronic pen 12 in the state in which the movement mechanism 18 is grasping the electronic pen 12, the control apparatus 20 that controls driving of the movement mechanism 18, and the rotation mechanism 16 that rotates the planar sensor 22, with the normal direction of the planar sensor 22 being the axis of the rotation. The planar sensor 22 is disposed in such a manner that the direction of the third axis (Z-axis) orthogonal to each of the first axis (X-axis) and the second axis (Y-axis) in the three-dimensional machine coordinate system defined for controlling driving of the movement mechanism 18 is orthogonal to the sensor coordinate plane 40 formed by the first axis (U-axis) and the second axis (V-axis) of the two-dimensional sensor coordinate system defined in the planar sensor 22.

The control apparatus 20 adjusts the position of the machine coordinate plane 50 formed by the X-axis and the Y-axis of the three-dimensional machine coordinate system to cause the reference point on the sensor coordinate plane 40 (sensor reference point CP) to correspond with the reference point on the machine coordinate plane 50 (machine reference point Pt2) in the state in which the planar sensor 22 has been rotated by the rotation mechanism 16 to cause the orientation of the machine coordinate plane 50 to correspond with the orientation of the sensor coordinate plane 40.

Further, in the evaluation method using the evaluation system 10 in this embodiment, the control apparatus 20 includes the disposing step (step S11) of disposing the planar sensor 22 in such a manner that the direction of the Z-axis in the three-dimensional machine coordinate system is orthogonal to the sensor coordinate plane 40 formed by the U-axis and the V-axis of the two-dimensional sensor coordinate system, the angle adjustment step (step S15) of executing angle adjustment to cause the orientation of the machine coordinate plane 50 to correspond with the orientation of the sensor coordinate plane 40 by rotating the disposed planar sensor 22, with the normal direction being the axis of the rotation, and the position adjustment step (step S17) of executing position adjustment to cause the sensor reference point CP on the sensor coordinate plane 40 that has been rotated to correspond with the machine reference point Pt2 on the machine coordinate plane 50.

By executing [1] the orientation adjustment of the normal direction, [2] the angle adjustment of the plane, and [3] the position adjustment of the plane in the machine coordinate plane 50 in this order as described above, the position adjustment between the three-dimensional machine coordinate system and the two-dimensional sensor coordinate system can be executed with a simpler system configuration.

Moreover, the angle adjustment step may include the acquisition step (step S110) of acquiring a coordinate value set indicating the positions of a plurality of points on the sensor coordinate plane 40 corresponding to the positions of a plurality of points that exist on the X-axis of the machine coordinate plane 50 or on an imaginary line parallel to this X-axis, and the decision step (step S113) of deciding the amount of rotation of the planar sensor 22 from the acquired coordinate value set.

In addition, the angle adjustment step may further include the settlement step (step S111) of settling the orientation of the planar sensor 22 by executing the acquisition step and the decision step one time or repeatedly executing these steps two or more times.

Further, in the case in which the plurality of points include the first point (first measurement point Pt4) and the second point (second measurement point Pt5) selected in such a manner that the machine reference point Pt2 on the machine coordinate plane 50 is interposed between the first and second points, in the settlement step, the orientation of the planar sensor 22 may be settled when the difference |ER−EL| between the coordinate value of the first measurement point Pt4 and the coordinate value of the second measurement point Pt5 on the V-axis of the sensor coordinate plane 40 is smaller than the threshold (Th2) settled in advance.

Moreover, when the evaluation system 10 further includes the sensor controller 24 that is connected to the planar sensor 22 and that outputs coordinate values indicating the position indicated by the electronic pen 12, the coordinate value set output from the sensor controller 24 may be acquired in the acquisition step.

Furthermore, when the touch surface 28 with which the pen tip of the electronic pen 12 comes into contact is disposed over the planar sensor 22, the acquisition step may include [1] the step in which the electronic pen 12 executes pen-down and pen-up at one point among the plurality of points on the touch surface 28 through driving by the movement mechanism 18 and [2] the step in which the sensor controller 24 acquires coordinate values indicating the position of the one point on the sensor coordinate plane 40, with detection of the pen-down being the trigger.

Modifications

Note that it is obvious that the present disclosure is not limited to the above-described embodiment and can freely be changed without departing from the gist of this disclosure.

Alternatively, any combination from the respective configurations may be employed in a range in which no contradiction is caused technically. Alternatively, the order of execution of the respective steps configuring a flowchart may be changed in a range in which no contradiction is caused technically.

In the above-described embodiment, description has been made by taking as an example the case in which the position indicated by the electronic pen 12 is detected by use of the position detection function that the inspection terminal 14 has. However, the detection method for the indicated position is not limited to this configuration. For example, a camera oriented toward the touch surface 28 may be disposed, and the position indicated by the electronic pen 12 may be detected by analyzing a taken image.

Figure 6:
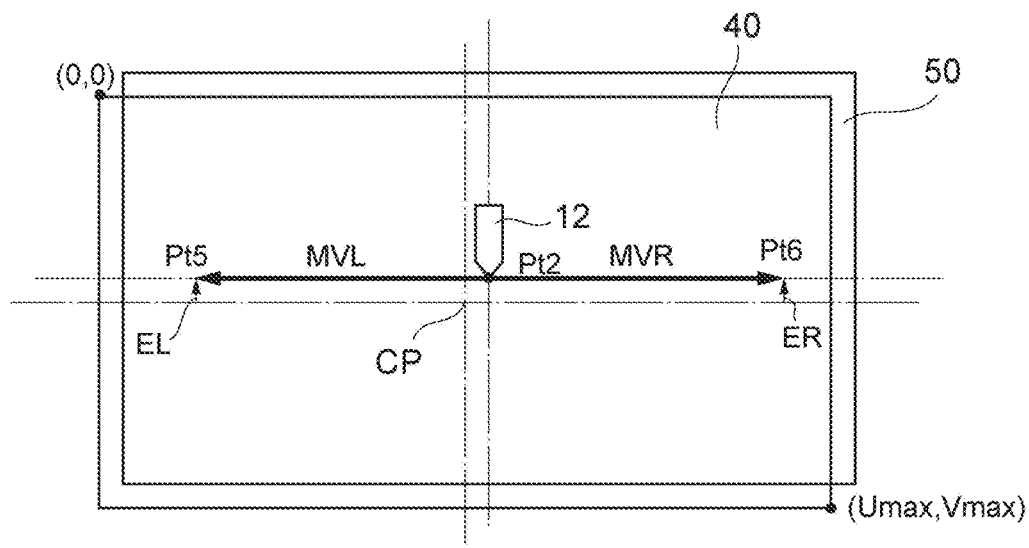
FIG. 6 is a diagram illustrating one example of a calculation result of a position error on the sensor coordinate plane after angle adjustment.
Figure 7:
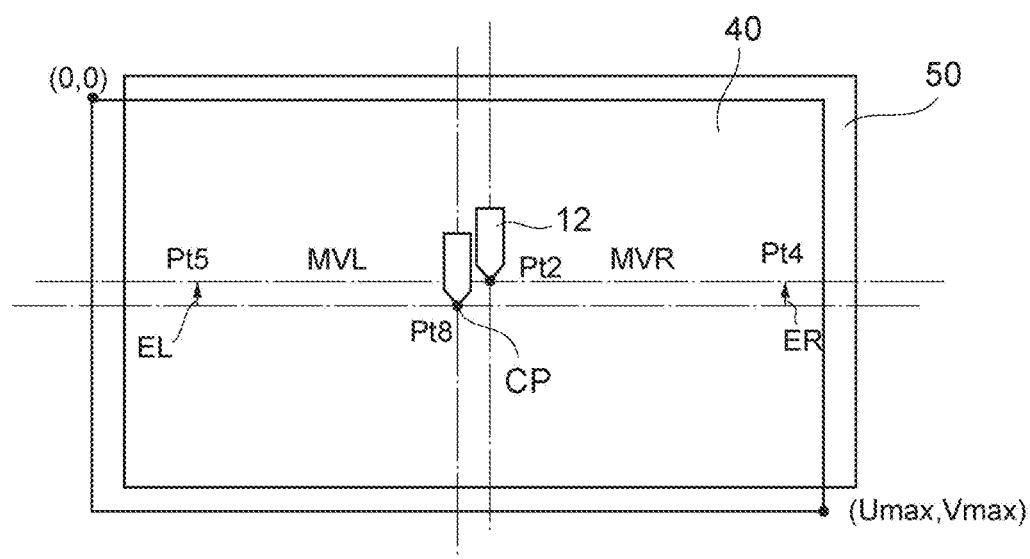
FIG. 7 is a diagram illustrating one example of an adjustment method for a reference point on the machine coordinate plane.

In the above-described embodiment, description has been made by taking as an example the case in which the angle of the sensor coordinate plane 40 is adjusted while the electronic pen 12 is moved along the X-axis direction (FIGS. 5A to 6). However, the movement direction of the electronic pen 12 may be the Y-axis direction. In this case, the first measurement point Pt4 and the second measurement point Pt5 are set to exist on the Y-axis of the machine coordinate plane 50 or on an imaginary line parallel to this Y-axis.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An evaluation method for an electronic pen performed by an evaluation system including a planar sensor that detects a position of the electronic pen and a movement mechanism that moves the electronic pen in a state in which the movement mechanism is grasping the electronic pen, the evaluation method comprising:

disposing the planar sensor such that a direction of a third axis orthogonal to each of a first axis and a second axis in a three-dimensional machine coordinate system defined for controlling driving of the movement mechanism is orthogonal to a sensor coordinate plane formed by a first axis and a second axis of a two-dimensional sensor coordinate system defined in the planar sensor;

performing angle adjustment by causing an orientation of a machine coordinate plane formed by the first axis and the second axis of the three-dimensional machine coordinate system to correspond with an orientation of the sensor coordinate plane by rotating the planar sensor, with a direction normal to the planar sensor being an axis of rotation; and performing position adjustment by causing a sensor reference point on the sensor coordinate plane that has been rotated to correspond with a machine reference point on the machine coordinate plane.

2. The evaluation method for an electronic pen according to claim 1, wherein, the performing angle adjustment includes:

acquiring a coordinate value set indicating positions of a plurality of points on the sensor coordinate plane corresponding to positions of a plurality of points on the first axis of the machine coordinate plane or on an imaginary line parallel to the first axis, and deciding an amount of rotation of the planar sensor from the coordinate value set acquired.

3. The evaluation method for an electronic pen according to claim 2, wherein, the performing angle adjustment further includes settling an orientation of the planar sensor by performing the acquiring the coordinate value set and the deciding the amount of rotation one time or repeatedly performing the acquiring the coordinate value set and the deciding the amount of rotation two or more times.

4. The evaluation method for an electronic pen according to claim 3, wherein, the plurality of points include a first point and a second point selected such that the machine reference point on the machine coordinate plane is interposed between the first point and the second point, and, in the settling the orientation, the orientation of the planar sensor is settled when a difference between a coordinate value of the first point and a coordinate value of the second point on the second axis of the sensor coordinate plane is smaller than a threshold.

5. The evaluation method for an electronic pen according to claim 2, wherein, the evaluation system further includes a sensor controller that is connected to the planar sensor and that outputs coordinate values indicating a position indicated by the electronic pen, and the coordinate value set output from the sensor controller is acquired in the acquiring the coordinate value set.

6. The evaluation method for an electronic pen according to claim 5, wherein, a touch surface with which a pen tip of the electronic pen comes into contact is disposed over the planar sensor, and the acquiring the coordinate value set includes:

performing, by the electronic pen, a pen-down operation and a pen-up operation at one point among the plurality of points on the touch surface through driving by the movement mechanism, and acquiring, by the sensor controller, coordinate values indicating a position of the one point on the sensor coordinate plane, with detection of the pen-down operation being a trigger.

7. An evaluation system for an electronic pen, the evaluation system comprising:

a planar sensor that, in operation, detects a position of the electronic pen;

a robot that, in operation, moves the electronic pen in a state in which the robot is grasping the electronic pen;

a control apparatus that, in operation, controls driving of the robot; and a rotating table that, in operation, rotates the planar sensor, with a direction normal to the planar sensor being an axis of rotation, wherein the planar sensor is disposed such that a direction of a third axis orthogonal to each of a first axis and a second axis in a three-dimensional machine coordinate system defined for controlling driving of the robot is orthogonal to a sensor coordinate plane formed by a first axis and a second axis of a two-dimensional sensor coordinate system defined in the planar sensor, and wherein the control apparatus, in operation, adjusts a position of a machine coordinate plane formed by the first axis and the second axis of the three-dimensional machine coordinate system by causing a sensor reference point on the sensor coordinate plane to correspond with a machine reference point on the machine coordinate plane in a state in which the planar sensor has been rotated by the rotating table to cause an orientation of the machine coordinate plane to correspond with an orientation of the sensor coordinate plane.

* * * * *